(12) United States Patent
Krawczyk

(10) Patent No.: US 7,743,895 B2
(45) Date of Patent: Jun. 29, 2010

(54) VIBRATION DAMPER

(75) Inventor: Anton Krawczyk, Windeck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 573 days.

(21) Appl. No.: 11/716,959

(22) Filed: Mar. 12, 2007

(65) Prior Publication Data

US 2007/0221458 A1    Sep. 27, 2007

(30) Foreign Application Priority Data

Mar. 11, 2006    (DE) .................. 10 2006 011 351

(51) Int. Cl.
    *F16F 9/56*    (2006.01)
(52) U.S. Cl. .................... 188/282.8; 188/304
(58) Field of Classification Search .......... 188/304, 188/305, 282.5, 282.8
    See application file for complete search history.

(56) References Cited

U.S. PATENT DOCUMENTS

| | | | |
|---|---|---|---|
| 2,740,500 A * | 4/1956 | Brundrett et al. ......... | 188/282.5 |
| 3,447,644 A | 6/1969 | Duckett | |
| 4,254,849 A * | 3/1981 | Pohlenz ................ | 188/275 |
| 6,318,523 B1 * | 11/2001 | Moradmand et al. ........ | 188/280 |
| 6,651,787 B2 | 11/2003 | Grundei | |
| 2002/0027051 A1 | 3/2002 | Grundei | |
| 2006/0049014 A1 * | 3/2006 | Vanspauwen ............... | 188/284 |

FOREIGN PATENT DOCUMENTS

| | | |
|---|---|---|
| DE | 6604946 | 5/1970 |
| DE | 27 51 488 | 5/1979 |
| DE | 100 41 199 | 11/2001 |
| DE | 10 2004 015 448 | 8/2005 |
| JP | 10-339345 | 12/1998 |

OTHER PUBLICATIONS

European Search Report dated Aug. 4, 2008 issued in corresponding application No. EP 07 00 3945.
German Office action dated Nov. 10, 2006 issued in corresponding application No. 10 2006 011 351.9.

* cited by examiner

*Primary Examiner*—Xuan Lan Nguyen
(74) *Attorney, Agent, or Firm*—Cohen Pontani Lieberman & Pavane LLP

(57) ABSTRACT

Vibration damper comprising a cylinder in which a piston rod is guided with freedom of axial movement, where the piston rod cooperates with a piston arrangement comprising a first, stationary piston and at least one additional piston, which is supported on the piston rod with freedom of axial movement against the elastic force of at least one restoring spring, where the cylinder is divided by the stationary piston and by the minimum of one axially movable piston into a working space on the side of the piston facing the piston rod, a working space on the side of the piston facing away from the piston rod, and a working space between the two pistons, where valve-equipped through-openings control a connection between the working spaces, and where the axial movement of the minimum of one axially movable piston is limited by a hydraulic pressure stop.

7 Claims, 1 Drawing Sheet

VIBRATION DAMPER

BACKGROUND OF THE INVENTION

1. Field of the Invention

The invention pertains to a vibration damper of the type having a piston rod guided with freedom of axial movement in a cylinder; a first piston fixed to the piston rod so that the first piston is stationary with respect to the piston rod, the first piston bounding a first working space facing away from the piston rod; and a second piston mounted on the piston rod with freedom to move axially with respect to the first piston against the force of at least one restoring spring, the second piston bounding a second working space facing the piston rod and an intermediate working space between the pistons; and at least two openings in each piston connecting the working spaces, the openings being equipped with non-return valves.

2. Description of the Related Art

A vibration damper with a cylinder in which a piston rod is guided with freedom of axial movement, where a first piston is mounted in a stationary manner on the piston rod and a second piston is mounted with freedom to move axially on the piston rod against an elastic force, is known from the U.S. Pat. No. 6,651,787, which represents the state of the art. The two pistons divide the cylinder into a working space on the side of the second piston facing the piston rod, a working space on the side of the first piston facing away from the piston rod, and a working space between the two pistons. Valve-equipped through-openings control a connection between the working spaces. The second piston has at least one restoring spring on each side and is supported so that it can move in either of the two axial directions against the force of the restoring springs.

This vibration damper design offers very comfortable driving behavior in many types of vehicles. There are applications, however, in which the forces generated by the restoring springs are too weak, as a result of which each of the restoring springs is formed by two springs arranged one inside the other to form a set. These sets of springs, however, are difficult to install and occupy a relatively large amount of radial space. Springs with a progressive spring characteristic are very expensive.

SUMMARY OF THE INVENTION

An object of the present invention is to provide the axially movable piston with a characteristic curve which, in comparison to the state of the art, makes available a much higher force level for the support of the piston.

According to the invention, the axial movement of the minimum of one axially movable piston is limited by a hydraulic pressure stop.

The throttling force of the pressure stop is available in addition to the support forces of the restoring springs, and this throttling force is made available in a comparatively very small amount of space.

The pressure stop is formed by a displacer sleeve, which can travel into a stop cup.

A spring collar for the restoring spring is mounted on the axially movable piston; the side of this collar which faces away from the axially movable piston is designed in the form of a displacer sleeve or a stop cup.

In addition, at least one spring collar for the restoring spring of the axially movable piston is mounted in a stationary manner with respect to the piston rod; the side of this collar which faces the axially movable piston is designed in the form of a displacer sleeve or a stop cup. With respect to the action of the pressure stop, it does not matter where the displacer sleeve and the stop cup are located, as long as one of these components is on one of the two spring collars which is free to move axially relative to each other and the other component is on the other spring collar.

According to another advantageous embodiment, the effective cross section of the displacer sleeve in the stop cup increases at least over the length of its stroke. This effect can be achieved, for example, by giving the displacer sleeve a conical contour, across which damping medium can flow into the stop cup during the outward travel of the displacer sleeve.

To avoid negative pressure from developing in the stop cup, a residual damping cross section is always present between a lateral surface of the displacer sleeve and a wall of the stop cup regardless of the depth to which the displacer sleeve travels into the stop cup.

According to an especially favorable, compact design of the pressure stop, the displacer sleeve is formed radially inside an annular space bounded by the restoring spring.

The displacer space of the stop cup is bounded radially by the wall of the stop cup and the lateral surface of the piston rod. As a result, the stop cup can have a very simple physical contour.

To avoid extreme stress peaks in the restoring spring, the displacer sleeve comes to rest axially in the stop cup, and the restoring spring has used up all of its elastic travel.

Stop noises do not occur, because at least one of the components, i.e., either the displacer sleeve or the stop cup, is made of plastic.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
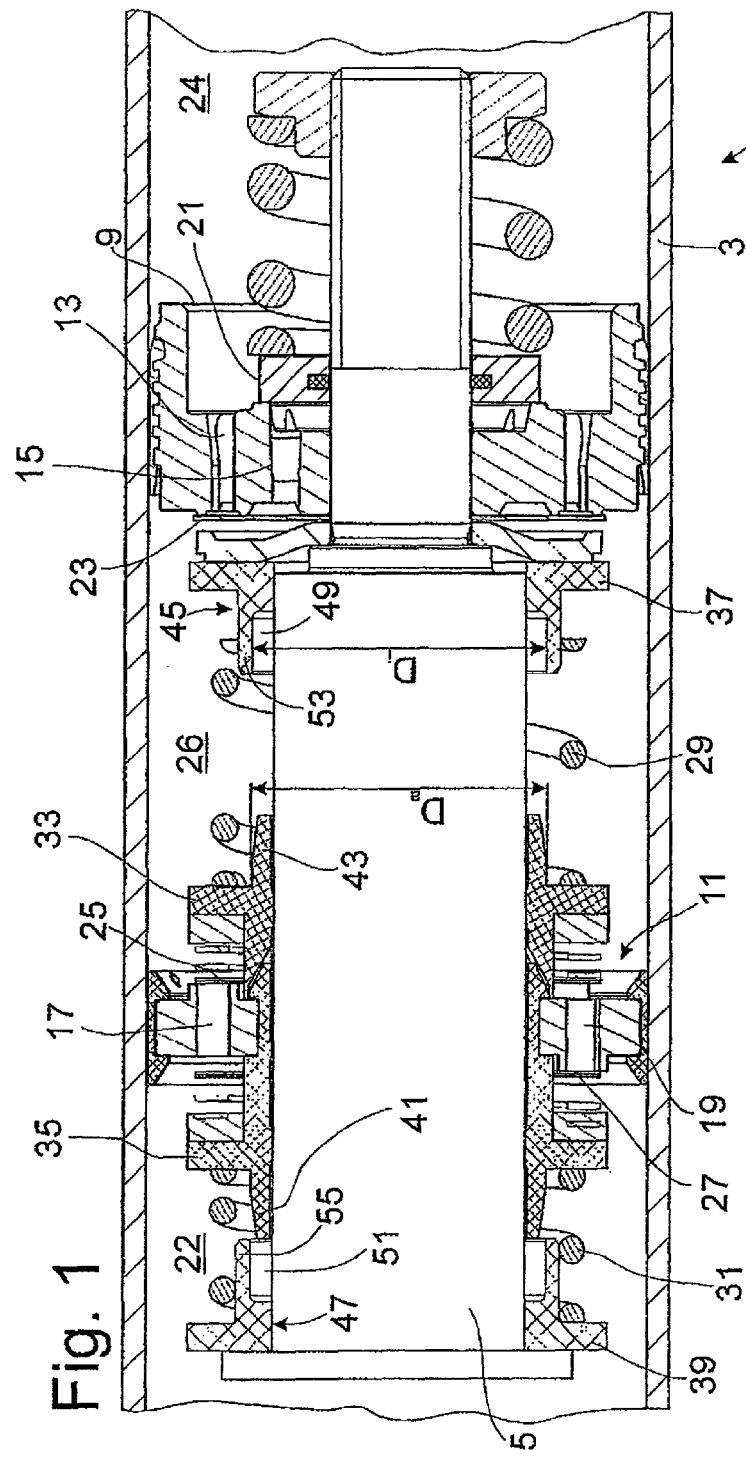
FIG. 1 shows a cross-sectional diagram of the piston arrangement mounted on the piston rod.
Figure 2:
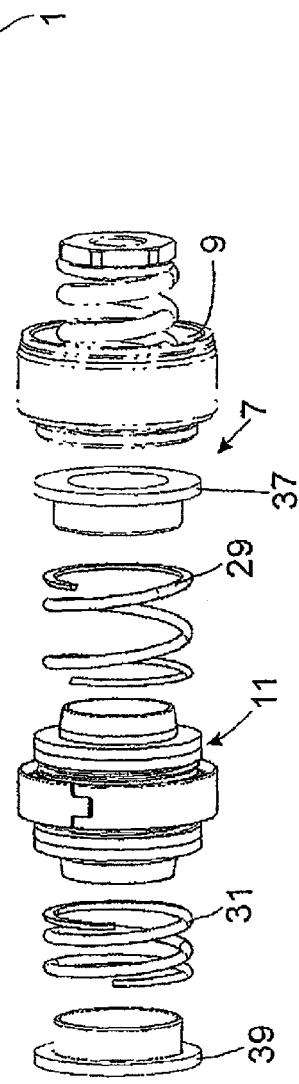
FIG. 2 shows an exploded view of the arrangement according to FIG. 1.

FIGS. 1 and 2 show part of a vibration damper 1, in the cylinder 3 of which a piston rod 5 is guided with freedom of axial movement. The piston rod 5 cooperates with a piston rod arrangement 7, which has, among other things, a first piston 9, which is mounted permanently on a piston rod pin. In addition, the piston rod arrangement 7 includes a second piston 11, which is supported in such a way that it can move axially on the piston rod within certain limits. Both the first piston 9 and the second piston 11 are designed with flow-through channels 13, 15, 17, 19, each of which is equipped on the outlet side with at least one valve disk 21, 23, 25, 27. The piston arrangement 7 divides the damping medium-filled cylinder 3 into a working space 22 on the side of the piston facing the piston rod, a working space 24 on the side of the piston facing away from the piston rod, and a working space 26 between the two pistons 9, 11.

The axially movable piston 11 is pretensioned on each side by at least one restoring spring 29, 31 so that the piston 11 is held in a starting position in the absence of any movement by the piston rod 5. The two restoring springs 29, 31 are supported at their ends against spring collars 33, 35 on the axially movable piston 11 and against spring collars 37, 39, which are stationary with respect to the piston rod.

The piston arrangement 7 has a pressure stop for each of two directions of movement of the axially movable piston 11. Each of these stops is formed by a displacer sleeve 41, 43, which can travel into a stroke-stopping cup 45, 47. In the present exemplary embodiment, a displacer sleeve 41, 43 is formed on each of the spring collars 33, 35 for the restoring springs, namely, on the sides of the collar facing away from the piston 11. A stop cup 45, 47, is mounted permanently on each of the spring collars 37, 39 which is stationary with respect to the piston rod. The displacer spaces 49, 51 are bounded radially on the outside by a wall 53, 55 of the spring collar and radially on the inside by the piston rod 5.

The displacer sleeves 41, 43 and the stop cups 45, 47 are located inside an annular space bounded by the restoring springs 29, 31. The maximum effective outside diameter $D_a$ of the displacer sleeve 41, 43 is smaller by a defined amount than the inside diameter $D_i$ of the stop cup 45, 47, so that, regardless of the depth to which the displacer sleeve 41, 43 travels into the stop cup 45, 47, there will always be a residual throttling cross section remaining between the lateral surface of the displacer sleeve and the wall 53, 55 of the stop cup. The displacer sleeve can have a conical shape, for example, so that its effective cross section increases at least over the length of its stroke.

The displacer sleeve 41, 43 can come to rest axially in the stop cup 45, 47, where the restoring spring 29, 31 still has some elastic travel left. Stop noises do not occur, because at least one of the components, i.e., either the displacer sleeve or the stop cup, is made of plastic.

The hydraulic operation of the piston arrangement without a pressure stop is described in U.S. Pat. No. 6,651,787. The disclosure of which is incorporated herein by reference.

The damping force characteristic of the piston arrangement is modified in the sense that, as a result of the pressure stop, the piston 11 can still move in the axial direction even at relatively high piston rod velocities and thus with very high pressures on the piston. The compressive forces in the displacer spaces 49, 51 support the functionally parallel restoring springs 29, 31, so that the end position of the second piston 11 is reached only at relatively high piston rod velocities, the maximum damping force therefore being reached only at this point also. When the direction in which the piston arrangement 7 is moving reverses, the axially movable piston 11, carrying with it its displacer sleeves 41, 43, can be moved back into the neutral starting position by the force of the restoring springs alone, because the previously mentioned residual throttle cross section allows additional damping medium to flow into the displacer spaces 49, 51.

The invention is not limited by the embodiments described above which are presented as examples only but can be modified in various ways within the scope of protection defined by the appended patent claims.

I claim:

1. A vibration damper comprising:
   a cylinder;
   a piston rod guided with freedom of axial movement in the cylinder;
   a first piston fixed to the piston rod so that the first piston is stationary with respect to the piston rod, said first piston bounding a first working space facing away from the piston rod;
   a second piston mounted on the piston rod with freedom to move axially with respect to the first piston against the force of at least one restoring spring, said second piston bounding a second working space facing the piston rod and an intermediate working space between the pistons;
   at least two openings equipped with non-return valves in each of said pistons, said openings connecting said working spaces; and
   a hydraulic pressure stop limiting the movement of said second piston in at least one direction with respect to said first piston;
   wherein the pressure stop comprises a displacer sleeve and a stop cup, said displacer sleeve being received in said stop cup to limit movement of said second piston with respect to said first piston, and the restoring spring delimits an annular space between the restoring spring and the piston rod, the displacer sleeve being located inside the annular space and the displacer sleeve has a cross-section which increases as it enters the stop cup, thereby increasing throttling of hydraulic fluid as the sleeve enters the cup.

2. The vibration damper of claim 1 further comprising a spring collar fixed to the second piston, one of said displacer sleeve and said stop cup being fixed to a side of said collar facing away from said second piston.

3. The vibration damper of claim 1 further comprising a spring collar fixed to the piston rod and facing the second piston, one of said displacer sleeve and said stop cup being fixed to a side of said collar facing said second piston.

4. The vibration damper of claim 1 wherein the stop cup has an inner wall and the sleeve has an outer surface which define a damping cross-section therebetween, said damping cross-section diminishing to a residual damping cross-section as said sleeve enters the stop cup.

5. The vibration damper of claim 1 wherein the displacer sleeve comes to rest axially in the stop cup before the restoring spring has used up all of its elastic travel.

6. The vibration damper of claim 1 wherein one of said displacer sleeve and said stop cup is made of plastic.

7. The vibration damper of claim 1 wherein the stop cup has a displacer space which is bounded radially by a wall of the stop cup and a lateral surface of the piston rod.

* * * * *